United States Patent
Howarter et al.

(10) Patent No.: US 9,332,217 B2
(45) Date of Patent: May 3, 2016

(54) METHOD AND APPARATUS FOR COMMUNICATING DATA VIA A CABLE CARD

(75) Inventors: Jamie Howarter, Overland Park, KS (US); Michael Lesher, Louisburg, KS (US); Doug Ceballos, Olathe, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 1202 days.

(21) Appl. No.: 12/345,021

(22) Filed: Dec. 29, 2008

(65) Prior Publication Data

US 2010/0169940 A1   Jul. 1, 2010

(51) Int. Cl.

| | |
|---|---|
| *H04N 7/16* | (2011.01) |
| *H04N 7/10* | (2006.01) |
| *H04N 21/462* | (2011.01) |
| *H04N 5/44* | (2011.01) |
| *H04B 3/54* | (2006.01) |
| *H04L 12/28* | (2006.01) |
| *H04N 7/173* | (2011.01) |
| *H04N 21/418* | (2011.01) |
| *H04N 21/436* | (2011.01) |

(52) U.S. Cl.
CPC .............. *H04N 7/106* (2013.01); *H04B 3/54* (2013.01); *H04L 12/2801* (2013.01); *H04N 5/4401* (2013.01); *H04N 7/163* (2013.01); *H04N 7/17318* (2013.01); *H04N 21/4181* (2013.01); *H04N 21/43615* (2013.01); *H04N 21/4622* (2013.01); *H04B 2203/545* (2013.01)

(58) Field of Classification Search
USPC .................................................. 725/141, 153
See application file for complete search history.

(56) References Cited

U.S. PATENT DOCUMENTS

| | | | | |
|---|---|---|---|---|
| 7,134,134 B2* | 11/2006 | Fries | ..................... | H04N 5/4401 235/380 |
| 7,346,917 B2* | 3/2008 | Gatto et al. | ........................ | 725/5 |
| 7,552,456 B2* | 6/2009 | Ciardullo | ............... | G06Q 10/02 705/14.65 |
| 7,839,886 B2* | 11/2010 | Cha | ......................... | H04N 7/163 370/463 |
| 8,755,265 B2* | 6/2014 | Morrissey | ............... | H04L 12/10 370/216 |
| 2001/0007151 A1* | 7/2001 | Vorenkamp et al. | .......... | 725/151 |
| 2002/0112236 A1* | 8/2002 | Sukeda et al. | ................... | 725/25 |
| 2002/0138837 A1* | 9/2002 | Fries et al. | ...................... | 725/55 |
| 2003/0028883 A1* | 2/2003 | Billmaier et al. | ............... | 725/46 |
| 2004/0215964 A1* | 10/2004 | Barlow et al. | .................. | 713/172 |
| 2005/0071866 A1* | 3/2005 | Louzir et al. | .................... | 725/31 |
| 2005/0091681 A1* | 4/2005 | Borden et al. | ................... | 725/31 |
| 2005/0160448 A1* | 7/2005 | Duffield et al. | ................... | 725/2 |
| 2005/0268324 A1* | 12/2005 | An | ................. | 725/152 |
| 2006/0010481 A1* | 1/2006 | Wall et al. | ..................... | 725/151 |
| 2006/0271987 A1* | 11/2006 | Eisenberg et al. | ............. | 725/111 |
| 2007/0005506 A1* | 1/2007 | Candelore | ...................... | 705/59 |
| 2007/0074256 A1* | 3/2007 | Jung | .................. | H04N 7/17354 725/100 |
| 2007/0083897 A1* | 4/2007 | Brownell | ........................ | 725/61 |
| 2007/0200727 A1* | 8/2007 | Sakamoto | ............... | 340/825.25 |
| 2007/0250872 A1* | 10/2007 | Dua | ................. | 725/81 |
| 2008/0028434 A1* | 1/2008 | Drazin | .......................... | 725/134 |
| 2008/0320545 A1* | 12/2008 | Schwartz | ........... | H04N 7/17318 725/135 |
| 2009/0100490 A1* | 4/2009 | Nandhakumar | ............... | 725/114 |
| 2009/0133090 A1* | 5/2009 | Busse | .................... | H04N 7/163 725/132 |
| 2009/0193489 A1* | 7/2009 | White | .................... | H04N 7/163 725/134 |
| 2010/0060789 A1* | 3/2010 | Aoki et al. | ..................... | 348/563 |
| 2010/0107186 A1* | 4/2010 | Varriale et al. | .................. | 725/31 |

* cited by examiner

*Primary Examiner* — Jonathan V Lewis

(74) *Attorney, Agent, or Firm* — Swanson & Bratschun, L.L.C.

(57) ABSTRACT

Embodiments of the disclosed invention include a method and apparatus for communicating data via a cable card having a network interface. In one embodiment, a method is disclosed for playing an external media content file routed through the network interface of the cable card. In another embodiment, a method is disclosed for utilizing a single cable card on multiple media devices for enabling access to protected media content on the multiple media devices.

5 Claims, 3 Drawing Sheets

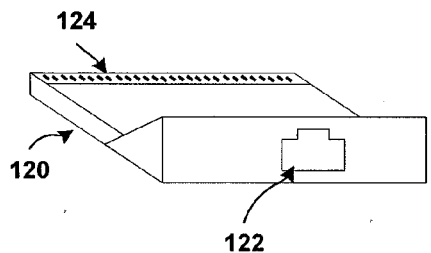
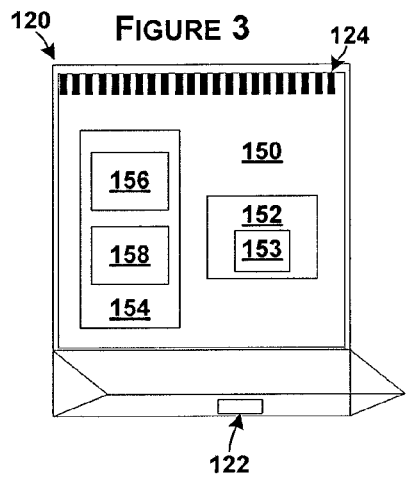
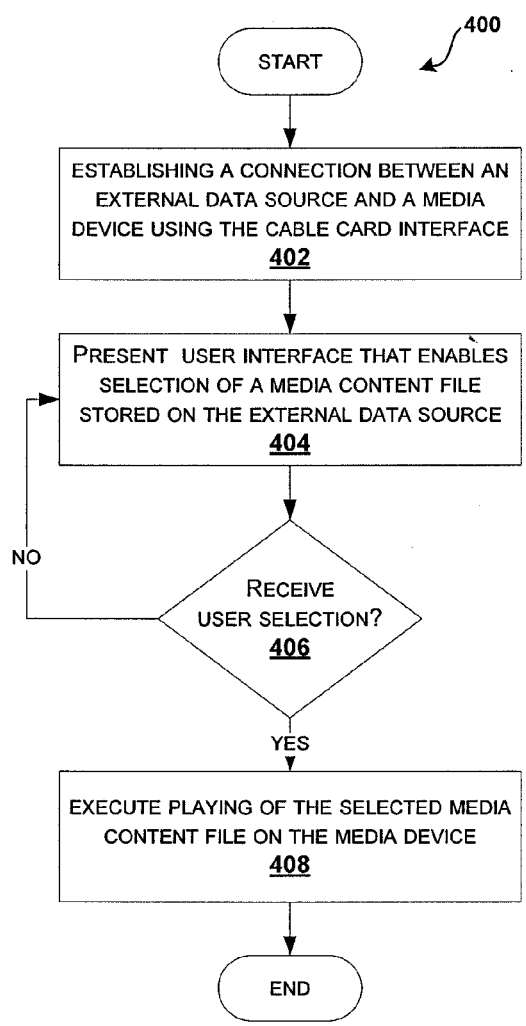

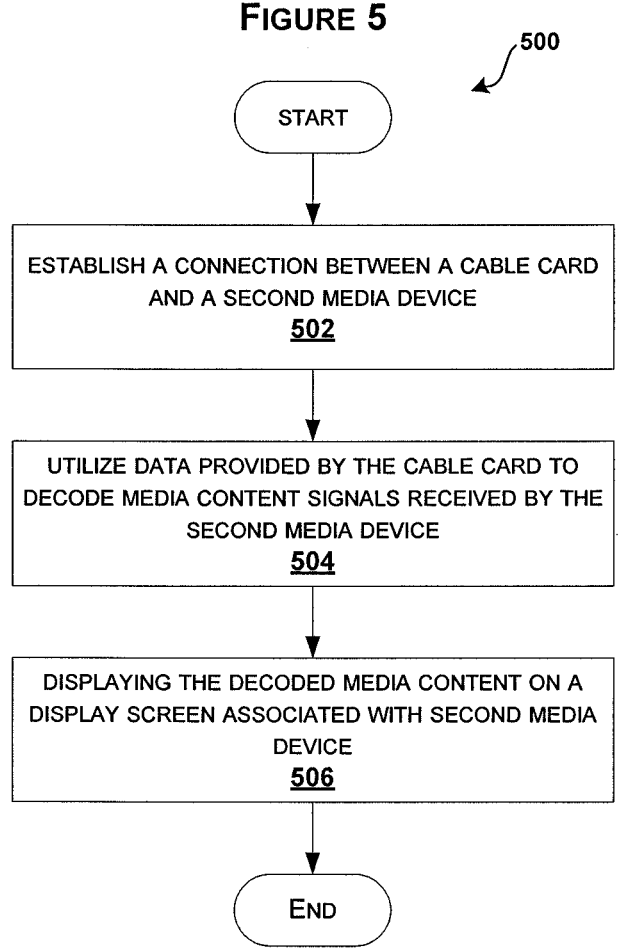

METHOD AND APPARATUS FOR COMMUNICATING DATA VIA A CABLE CARD

BACKGROUND OF THE INVENTION

The Telecommunications Act of 1996 required cable/satellite companies to allow non-cable company provided devices, such as, third party set-top boxes and cable card ready television sets, to access their networks. As a result, the cable industry produced a cable card. A cable card is a plug-in card approximately the size of a credit card that allows consumers to view cable television on generic set top boxes or on some televisions without the use of a set-top box. Cable card support is most common on higher end televisions that include a special slot for the cable card and a built-in cable tuner. The cable card acts like a unique "key" to unlock the channels and services to which the cable customer has subscribed.

SUMMARY OF THE INVENTION

Embodiments of the disclosed invention include a method and apparatus for communicating data via a cable card. In one embodiment, the method includes establishing a connection between an external data source and a media device using a cable card interface. The external data source and the media device are located within the same residential location. For example, the media device may a set-top box or a cable card ready television set. The external data source may be a personal computer or an external hard drive. The method presents a user interface on a display screen associated with the media device that enables a user to select a media content file stored on the external data source. In response to receiving a user selection of a media content file stored on the external data source, the method plays the selected media content file on the media device. Additionally, in some embodiments, the method also includes recording media content received by the media device onto the external data source.

In accordance with another embodiment, a method for utilizing a cable card on multiple media devices is disclosed. The method includes establishing a connection between a cable card and a second media device. In one embodiment, the cable card is utilized by a first media device located within the same residential location as the second device. The connection is established using a network interface of the cable card. For example, in some embodiments, the network interface may be an Ethernet connection. The method utilizes data provided by the cable card to decode media content signals received by the second media device for displaying the decoded media content on a display screen associated with the second media device.

Additionally, in accordance with another embodiment, a cable card for communicating data to a second device is disclosed. The cable card includes an interface for coupling the cable card to a first media device located at a residential location. The cable card also includes a network interface for communicatively coupling the cable card to a second device located at the residential location. The cable card includes memory for storing decryption data and computer executable instructions. The cable card also includes a processing unit that utilizes the decryption data to decode media content signals to display media content on a display screen associated with the first media device. The processing unit also executes the computer executable instructions to communicate data between the cable card and the second device via the network interface of the cable card. In addition, in some embodiments, the cable card includes hardware and/or software for establishing the connection to the second device, accessing data stored on the second device, and for playing media content files retrieved from the second device.

Further details and advantages of the present invention will be discussed in the following detailed description of the preferred embodiments.

BRIEF DESCRIPTION OF THE DRAWINGS

For a more complete understanding of the present application, the objects and advantages thereof, reference is now made to the following descriptions taken in conjunction with the accompanying drawings, in which:

FIG. 2 depicts an external view of a cable card in accordance with an illustrative embodiment;

FIG. 3 depicts an internal view of a cable card in accordance with an illustrative embodiment;

FIG. 4 depicts an embodiment of a process for communicating data via a cable card; and FIG. 5 depicts an embodiment of a process for utilizing a cable card on multiple media devices.

DETAILED DESCRIPTION OF THE DRAWINGS

Figure 1:
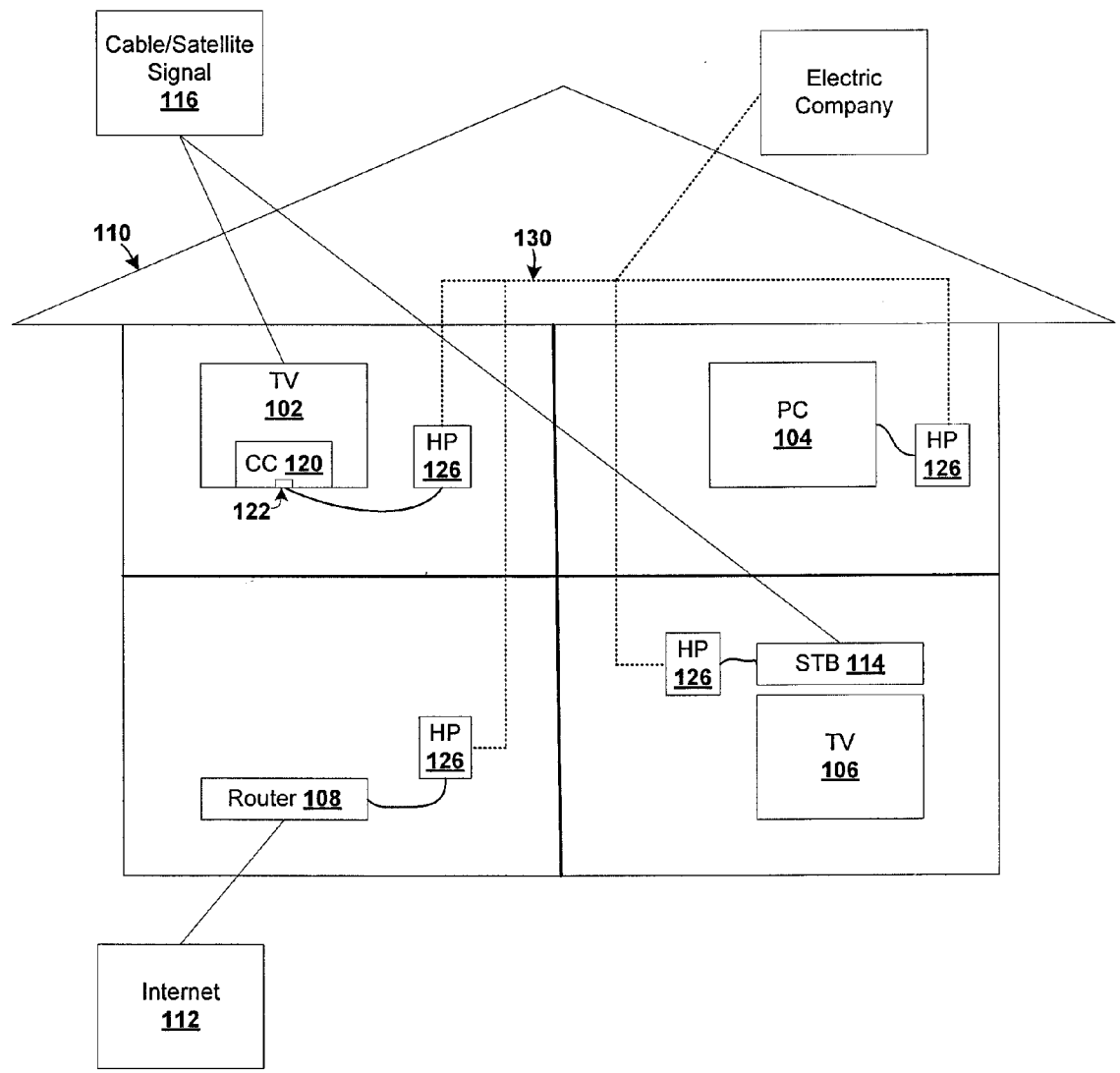
FIG. 1 depicts an embodiment of a network environment in which the illustrative embodiments may be implemented.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

FIG. 1 depicts an embodiment of a network environment in which the illustrative embodiments may be implemented. In the depicted embodiment, a television 102, personal computer 104, television 106, and router 108 are located within residential location 110. Residential location 110 may be a single family home, a townhouse/condo, and/or an apartment.

Television 102 is a cable card ready television unit, also commonly known as "digital cable ready" (DCR) device. Television 102 includes a built-in cable tuner that enables direct reception of digital cable channels without the use of a set-top box. Television 102 also includes a special slot for a cable card, such as, but not limited to, cable card 120.

Cable card 120 is a plug-in card approximately the size of a credit card that allows consumers to view cable television on a display device, such as, television 102. In one embodiment, cable card 120 is a PCMCIA type II card. Cable card 120 includes decryption data, such as, but not limited to, a decryption key used for decoding the encrypted television signals associated with a cable/satellite company 116. Additionally, cable card 120 may be a single stream card capable of decoding a single channel at a time or may be a multiple stream card capable of decoding multiple channels simultaneously. In some embodiments, cable card 120 may be used to access both Standard Definition and High Definition channels.

In accordance with one embodiment, cable card 120 includes a network interface 122 for communicatively coupling cable card 120 to a second device, such as, but not limited to, personal computer 104 and/or set-top box 114, located within residential location 110. In one embodiment, as depicted in FIG. 2, network interface 122 may be an Ethernet port. Alternatively, or in addition to, network interface 122 may include a wireless transceiver for sending and receiving data wirelessly. For example, in one embodiment, network interface 122 utilizes the 802.11x standard for wireless communication. In addition, cable card 120 includes an interface 124, as depicted in FIG. 2, for coupling cable card 120 to television 102. For example, in one embodiment, interface 124 uses a 68-pin connector for interfacing with television 102.

In one embodiment, an Ethernet cable 124, such as, but not limited to, a Category 5 cable, is used to connect cable card 120 via network interface 122 to a home network 130. For example, in one embodiment, Ethernet cable 124 connects network interface 122 of cable card 120 to a home plug 126 for coupling cable card 120 to home network 130. Home plug 126 is a device that is used for interconnecting home computers, peripherals, or other networked consumer devices, such as, but not limited to, personal computer 104, television 102, set-top box 114, and router 108, to home network 130 via power line communication. Power line communication is a system for carrying data on a conductor that is also used for electric power transmission.

In one embodiment, router 108 is connected to Internet 112. Router 108 may provide wired and/or wireless internet access to one or more devices, such as, but not limited to, personal computer 104 and/or set-top box 114. For example, in some embodiments, home plug 126 sends and receives radio signals over the power lines to provide personal computer 104, set-top box 114, and/or television 102 access to Internet 112. Internet 112 is a global system of interconnected computer networks that interchange data using the standardized Internet Protocol Suite (TCP/IP). Internet 112 includes millions of private and public networks that are linked by copper wires, fiber-optic cables, wireless connections, and other technologies.

Personal computer 104 is a data processing system comprising hardware and software for executing computer instructions. In some embodiments, personal computer 104 may be a laptop. In some embodiments, personal computer 104 includes computer executable instructions for establishing a connection with one or more devices on home network 130 in for sending and receiving data between the connected devices.

Set-top box 114 is a device that connects a television, such as, television 106, to an external signal source, such as, signals transmitted by cable/satellite company 116. Set-top box 114 decodes the received signals into viewable content that is displayed on television 106. In one embodiment, set-top box 114 requires a cable card, such as, cable card 120, provided by cable/satellite company 116 to decode the received signals. As will be further described, in one embodiment, a method is disclosed that enables multiple media devices within the same residential location to utilize a single cable card. For example, in one embodiment, set-top box 114 utilizes data provided by provided by cable card 120 via home network 130 to decode the received signals. In other embodiments, set-top box 114 may utilize data provided by cable card 120 via a wireless home network.

FIG. 3 depicts an internal view of cable card 120 in accordance with an illustrative embodiment. In one embodiment, cable card 120 includes a printed circuit board 150. Printed circuit board 150 uses conductive pathways/traces to mechanically support and electrically connect electronic components, such as, but not limited to, processing unit 152 and memory component 154. In some embodiments, printed circuit board 150 includes interface 124 for coupling cable card 120 to a digital cable ready television and/or a set top box. In addition, in some embodiments, printed circuit board 150 includes electrical components for supporting network interface 122, such as, but not limited to, an Ethernet port and/or a wireless transceiver.

Processing unit 152 may comprise of one or more microprocessors located on printed circuit board 150 for executing computer usable program code/instructions. In some embodiments, processing unit 152 executes instructions 156 in memory component 154, such as, a handshake process, for establishing data communications between cable card 120 and one or more electronic devices, such as, but not limited to, television 102, personal computer 104, and set-top box 114 over home network 130. A handshake is the process of one computer/device establishing a connection with another computer or device. The handshake process may include the steps of verifying the connection, the speed, and/or the authorization of the device trying to connect to it.

In some embodiments, processing unit 152 may include a system-on-a-chip (SOC) 153 for pushing and pulling a media content file and/or other data to and from a network device. System-on-a-chip 153 integrates all components of a computer or other electronic system into a single integrated circuit chip. For example, in one embodiment, system-on-a-chip 153 consists of both hardware and software for controlling processing unit 152 and/or other peripherals and interfaces communicatively coupled to cable card 120. For instance, in one embodiment, system-on-a-chip 153 may execute instructions for playing a media content file located on an external device, such as, but not limited to, personal computer 104 or an external hard drive, on television 102. Additionally, in some embodiments, system-on-a-chip 153 may execute instructions for recording and storing digital video content files on the external device. Further, in some embodiments, system-on-a-chip 153, as will be further described, may provide decryption data to one or more media devices within residential location 110 for decoding television signals.

Memory component 154 is a data storage component of cable card 120. In some embodiments, memory component 154 includes volatile memory. Volatile memory is memory that loses its contents when the computer or hardware device loses power. For example, in some embodiments, memory component 154 may be random access memory (RAM). Random access memory stores currently executing instructions and/or data utilized by an operating system, software program, hardware device, and/or a user.

In some embodiments, memory component 154 may also include non-volatile memory, such as, but not limited to, electrically erasable programmable read-only memory (EEPROM). EEPROM is user-modifiable read-only memory (ROM) that may be erased and reprogrammed repeatedly through the application of higher than normal electrical voltage. Non-volatile memory retains stored data without a power source.

In some embodiments, memory component 154 may be embedded memory located on printed circuit board 150. Alternatively, or in addition to, memory component 154 may be an external memory component interface with printed circuit board 150. For example, in some embodiments, a memory card, such as, but not limited to, a microSD card, may interface with printed circuit board 150.

Additionally, in some embodiments, memory component 154 may also store decryption data 158, such as, but not limited to, a decryption key/algorithm, a conditional access module identifier (CAM ID) and/or a zero knowledge test (ZKT) table, used for decoding the encrypted television signals associated with a cable/satellite company 116. ZIT tables are encryption tables used for proving the authenticity of the CAM ID. The CAM ID is a unique serial number programmed onto cable card 120 by cable/satellite company 116.

With reference now to FIG. 4, an embodiment of a process 400 for communicating data via cable card 120 is presented. Process 400 may be executed by one or more processors associated with cable card 120 and/or a device interfaced with cable card 120, such as, but not limited to, television 102. Process 400 begins, at step 402, by establishing a connection between an external data source (e.g., personal computer 104 and/or an external hard drive) and a media device (e.g., television 102 and/or set-top box 114) using network interface 122 of cable card 120. In some embodiments, a user and/or cable installer may pre-configure cable card 120 with the media access control (MAC) address/network address of all devices associated with home network 130, thus, enabling the network devices to communicate with each other. In other embodiments, cable card 120 may comprise computer executable instructions for dynamically establishing communication with any device connected to home network 130. In some embodiments, a connection may be established using physical wires to connect the media device directly to the external data source via network interface 122 of cable card 120.

At step 404, the process presents a user interface on a display screen associated with the media device, such as, but not limited to, television 102 to enable a user to select a media content file stored on the external data source. In some embodiments, the user interface may display a list of all media content files, such as, but not limited to, video files and mp3 files, located on the external data source. In other embodiments, user interface may display a directory hierarchy of the data folders located on the external data source and enable a user to navigate the directory hierarchy to locate a particular media content file.

At step 406, process waits to receive a user selection of the media content file. In response to receiving a user selection of the media content file, the process executes playing of the selected media content file on the media device, with process 400 terminating thereafter. For instance, in one embodiment, if the media device is television 102, television 102 displays the video associated with the selected media content file. In another embodiment, if the media device is a set-top box, such as, set-top box 114, a television, such as, television 106, communicatively coupled to the set-top box displays the video associated with the selected media content file. Thus, the disclosed embodiments enable a media content file located on external device to be played on a via a cable card network interface. Similarly, in some embodiments, the disclosed embodiments enable the media device to record media content files onto the external device via the cable card network interface.

FIG. 5 depicts an embodiment of a process 500 for utilizing a cable card, such as, but not limited to, cable card 120, on multiple media devices. Process 500 may be executed by one or more processors associated with the cable card and/or a device interfaced with the cable card, such as, but not limited to, a digital cable ready television or a set-top box. Process 500 begins, at step 502, by establishing a connection between the cable card and a second media device, such as, but not limited to, a set-top box or a digital cable ready television via a cable card network interface. In one embodiment, the cable card is utilized by a first media device such as, but not limited to, a set-top box or a digital cable ready television. In a preferred embodiment, the first device and the second device are located within the same residential location.

At step 504, the process utilizes data provided by the cable card to enable viewing of media content signals received by the second media device, such as, television signals received from cable/satellite company 116. In some embodiments, the second media device may include computer executable instructions for retrieving the data from the cable card to decode the media content signals to enable viewing of the media content. In another embodiment, the second media device may pass an authentication request to the cable card to authenticate the second media device as a device that is authorized to access the media content signals of cable/satellite company 116.

At step 506, the process displays the decoded media content on a display screen associated with the second media device, with process 500 terminating thereafter. For instance, if the second media device is a digital cable ready television the decoded media content is displayed on the television screen. If the second media device is a set-top box, the decoded media content is displayed on a television coupled to the set top box. If the second media device is a personal computer, the decoded media content is displayed on a computer monitor.

In summary, the disclosed embodiments include a method and apparatus for communicating data via a cable card having a network interface. For example, in one embodiment, the network interface is an Ethernet port. Additionally, in one embodiment, a method is disclosed for playing an external media content file routed through the network interface of the cable card. In another embodiment, a method is disclosed for utilizing a single cable card on multiple media devices for enabling access to protected media content on the multiple media devices.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A cable card comprising:
    an interface for coupling the cable card to a first media device located at a residential location;
    a memory interface located on the cable card providing for a direct connection of a removable external memory card to the memory interface located on the cable card, wherein the external memory card stores decryption data and computer executable instructions;
    an Ethernet port operable to receive an Ethernet cable for communicatively coupling the cable card to a second device located at the residential location; and
    a processing unit on the cable card that utilizes only the decryption data stored on the external memory card to decode media content signals from the second device and to display media content on a display screen associated with the first media device, wherein the processing unit executes only the computer executable instructions stored on the external memory card to communicate the media content signals between the cable card and the second device via the Ethernet port.

2. The cable card of claim 1, wherein the second device is a device that is configured to receive a second cable card and wherein the data communicated between the cable card and the second device enables the second device to utilize the cable card in place of the second cable card.

3. The cable card of claim 1, wherein the processing unit utilizes the computer executable instructions to play a media content file stored on the second device on the display screen associated with the first media device.

4. The cable card of claim 1, wherein the processing unit utilizes the computer executable instructions to record media content received by the first media device onto the second device.

5. A method for communicating data via a cable card, the method comprising:
    providing a cable card comprising:
        an interface for coupling the cable card to a first media device located at a residential location;
        a memory interface located on the cable card providing for a direct connection of a removable external memory card to the cable card, wherein the external memory card stores decryption data and computer executable instructions;
        an Ethernet port operable to receive an Ethernet cable for communicatively coupling the cable card to a second device located at the residential location; and
        a processing unit on the cable card that utilizes only the decryption data stored on the external memory card to decode media content signals from the second device and to display media content on a display screen associated with the first media device, wherein the processing unit executes only the computer executable instructions stored on the external memory card to communicate the media content signals between the cable card and the second device via the Ethernet port;

coupling the cable card to a first media device;

coupling the external memory card storing decryption data and computer executable instructions to the cable card;

coupling an Ethernet cable to the cable card and to the second device;

transmitting media content signals from the second device to the cable card; and decoding the media content signals at the cable card to display media content on a display screen associated with the first media device.

* * * * *